United States Patent
Klampfl et al.

(10) Patent No.: US 8,116,972 B2
(45) Date of Patent: Feb. 14, 2012

(54) SYSTEM AND METHOD FOR DETERMINING A VEHICLE REFUELING STRATEGY

(75) Inventors: Erica Klampfl, Canton, MI (US); Oleg Yurievitch Gusikhin, West Bloomfield, MI (US); Kacie Alane Theisen, Novi, MI (US); Yimin Liu, Ann Arbor, MI (US); Thomas J. Giuii, Ann Arbor, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 12/358,824

(22) Filed: Jan. 23, 2009

(65) Prior Publication Data
US 2009/0204316 A1   Aug. 13, 2009

Related U.S. Application Data

(60) Provisional application No. 61/027,149, filed on Feb. 8, 2008.

(51) Int. Cl.
*G01C 22/00* (2006.01)
*G06F 19/00* (2006.01)

(52) U.S. Cl. ......... 701/123; 701/202; 701/211; 340/439

(58) Field of Classification Search .................. 701/123, 701/202, 210, 212, 213; 340/438, 439, 457, 340/462; 705/1, 7, 10, 500
See application file for complete search history.

(56) References Cited

U.S. PATENT DOCUMENTS

| | | | |
|---|---|---|---|
| 5,568,390 A * | 10/1996 | Hirota et al. | 701/201 |
| 6,591,185 B1 | 7/2003 | Polidi et al. | |
| 6,691,025 B2 * | 2/2004 | Reimer | 701/123 |
| 7,668,644 B2 * | 2/2010 | Tengler et al. | 701/123 |
| 7,778,769 B2 * | 8/2010 | Boss et al. | 701/123 |
| 2002/0059075 A1 | 5/2002 | Schick et al. | |
| 2003/0036990 A1 | 2/2003 | Sprehe | |
| 2006/0118575 A1 | 6/2006 | Boyd et al. | |
| 2007/0262855 A1 | 11/2007 | Zuta et al. | |
| 2007/0290039 A1 | 12/2007 | Pfleging et al. | |
| 2009/0157289 A1 * | 6/2009 | Graessley | 701/123 |

OTHER PUBLICATIONS

International Search Report and Written Opinion in International Application No. PCT/US 09/32094 as mailed on Apr. 7, 2009.
Energy Information Administration, Price Changes in the Gasoline Market, Are Midwestern Gasoline Prices Downward Sticky?, Washington, DC, DOE/EIA-0626, Feb. 1999, pp. 1-52.
TMW Systems, Trucking and Transportation Software—Expert Fuel Integrated Fuel Optimization, http://www.idscnet.com/software/fuel.htm, 2008,—1-5.

* cited by examiner

*Primary Examiner* — Tan Q Nguyen
(74) *Attorney, Agent, or Firm* — Jennifer M. Stec; Brooks Kushman P.C.

(57) ABSTRACT

A method for generating a fueling strategy that generally minimizes fueling costs for a specified route to be traveled by a vehicle during a multi-day time period may include, based on current and forecasted fuel prices for the multi-day time period, (i) selecting at least one day during the multi-day time period on which to purchase fuel, (ii) selecting at least one fueling station along the route at which to purchase fuel for each selected day, and (iii) determining an amount of fuel to purchase at each selected fueling station.

12 Claims, 2 Drawing Sheets ns, such as a computer 22 and server 24. A transceiver 26 (such as a cell phone paired with the processor 12) may broadcast a communication signal modulated by modem 28

SYSTEM AND METHOD FOR DETERMINING A VEHICLE REFUELING STRATEGY

CROSS-REFERENCE TO RELATED APPLICATION

This application claims the benefit of U.S. Provisional Application No. 61/027,149, filed Feb. 8, 2008.

BACKGROUND

Different techniques are used to determine where to refuel a vehicle. U.S. Pat. No. 7,066,216 to Sato et al. provides a system for allocating fuel stations to movable bodies. The system includes an onboard unit, a station unit and a server. The onboard unit stores and updates information about a movable body. The station unit stores and updates information about a fuel station. The server is connected to the onboard unit and the station unit through networks. The server allocates certain fuel stations to the movable body based on the information about the movable body and the fuel station.

U.S. Pat. No. 6,691,025 to Reimer provides a system for monitoring fuel consumption and optimizing refueling of a vehicle. The system includes a fuel level sensor designed to be mounted on a fuel tank. The fuel sensor has a transducer for generating a distance signal that represents the distance between the sensor and the surface of the fuel in the fuel tank. A processor coupled to the transducer is programmed to convert the distance signal to a percentage of capacity signal, calculate the volume of fuel within the fuel tank, and create a message that includes information regarding the volume of fuel in the fuel tank. The processor is also coupled to a network that may include a dispatch terminal, a fuel optimization server and a fuel-price-by-location service. The network calculates an optimal location for refilling the fuel tank and a route to travel to the location. A message containing the refueling and route information is broadcast to the vehicle information system for the driver.

U.S. Pat. No. 6,078,850 to Kane et al. provides a management system for a vehicle having a commodity storage region and traveling along a path having a plurality of geographically-distributed commodity replenishing stations. The system includes a sensor for measuring a level of the commodity in the storage region and providing commodity level data. A global positioning system (GPS) determines a location of the vehicle along the path. A controller stores a record of current geographic locations of the commodity replenishing stations and current commodity prices thereat. The controller also calculates commodity replenishing schedules of the vehicle based on an output from the GPS and sensor, and a commodity price at some of the replenishing stations.

SUMMARY

A vehicle refueling advisory system may include one or more computers. The one or more computers may be configured to, for a specified route to be traveled during a multi-day time period, (i) select at least one day during the multi-day time period on which to purchase fuel, (ii) select at least one fueling station along the route at which to purchase fuel for each selected day, and (iii) determine an amount of fuel to purchase at each selected fueling station. The selections and determination are based on current and forecasted fuel prices for the multi-day time period to generally minimize fueling costs for the specified route.

While exemplary embodiments in accordance with the invention are illustrated and disclosed, such disclosure should not be construed as limiting. It is anticipated that various modifications and alternative designs may be made without departing from the scope of the invention.

DETAILED DESCRIPTION

Navigation services may supply fuel prices for a particular geographic region in response to driver requests. For example, a driver may request current fuel prices within a specified radius of the current location of their vehicle. With such information, the driver may decide where to buy fuel. Assuming the vehicle has a 10 gallon fuel tank half empty and the current cost of fuel is $3.00 per gallon, the total cost to refuel, at that instant, would be approximately $15.00. This total cost to refuel, however, may be reduced if expected fuel prices and expected driver patterns are considered. As an example, a vehicle refueling strategy may be determined based on expected drive patterns, current and expected fuel prices, and/or driver preferences. The expected drive patterns may be based on a driver created route and/or historical drive routes. The expected fuel prices may be based on current and historical fuel prices.

Some embodiments of the invention determine a refueling strategy to generally minimize fueling costs based on forecasted (future) fuel prices and expected (future) drive patterns. For example, a refueling strategy may recommend that 2 gallons of fuel be purchased on a given day and that another 8 gallons of fuel be purchased two days later, when fuel prices are forecasted to be lower.

A driver may access a remote server or on-board vehicle computer to build a driver profile for an upcoming driving period. The sever or on-board vehicle computer may forecast expected fuel prices and determine refueling recommendations based on the driver profile as well as current and expected fuel prices. These recommendations may be communicated to the vehicle, if necessary, via, for example, a wireless network or power line communication scheme, or may be uploaded to the vehicle from a memory storage device. Other configurations and arrangements are also possible.

Figure 1:
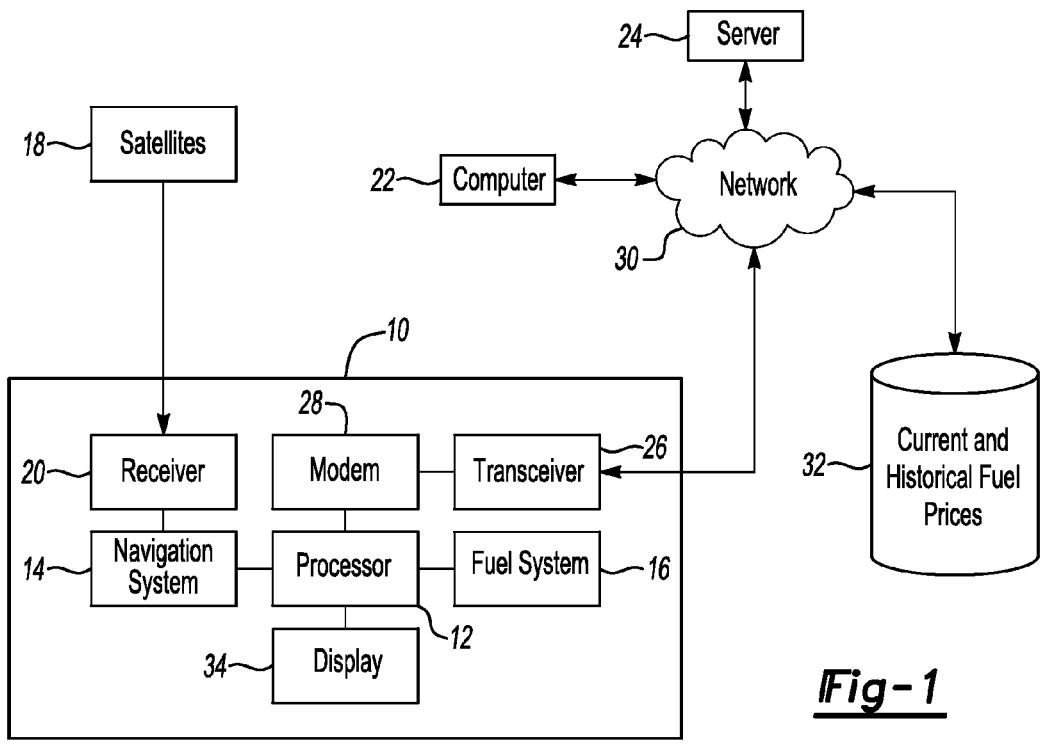
FIG. 1 is a block diagram of a vehicle refueling advisory system according to an embodiment of the invention.

Referring now to FIG. 1, a vehicle 10 includes a processor 12. The processor 12 communicates with a navigation system 14 and fuel system 16 via an internal vehicle network, e.g., controller area network (CAN). The navigation system 14 may, for example, compute its geographic position and velocity from the time of flight and Doppler shift of signals from a set of 3 or more satellites 18 to a receiver 20. The fuel system 16 provides information to the processor 12 regarding current fuel levels within a fuel tank of the vehicle 10, fuel consumption of the vehicle 10, and fuel carrying capacity of the fuel tank. As discussed below, this information may be used to create fuel purchase recommendations for the driver.

The processor 12 also communicates with remote terminals, such as a computer 22 and server 24. A transceiver 26 (such as a cell phone paired with the processor 12) may broadcast a communication signal modulated by modem 28 for reception by a network 30. As appreciated by those of ordinary skill, the network 30 may be any collection of communication networks effectively patched together to facilitate communication between the processor 12 and the remote terminals 22, 24. In the embodiment of FIG. 1, the network 30 includes a cellular network, the public switched telephone network (PSTN) and the Internet. The computer 22 and server 24 are directly connected with the Internet.

Wireless communication signals broadcast via the transceiver 26 are received by a cellular tower of the cellular network. The cellular network forwards the received information to the PSTN. The PSTN then forwards the information to the Internet for eventual delivery, for example, to the server 24. Likewise, the server 24 may communicate with the processor 12 via the network 30. In other embodiments, the vehicle 10 may include a wireless network transceiver, e.g., Evolution-Data Optimized transceiver, etc., which may communicate with wireless networks in a particular geographic region. Other communication arrangements, such as Wi-Fi, WiMax, etc., are of course also possible.

In the embodiment of FIG. 1, the server 24 collects data, generates a recommended refueling strategy and communicates this strategy to the processor 12 for delivery via a display 34. The server 24 receives input from the processor 12 and/or computer 22 regarding driver preferences, vehicle fueling capacity, and other information related to the vehicle 10 in advance of generating a vehicle refueling strategy. The server 24 also communicates with data stores 32 via the network 30, e.g., the Internet, to access current and historical fuel prices. In other embodiments, the processor 12 may collect the relevant data and generate the recommended refueling strategy. Other arrangements are also possible. For example, necessary data may be uploaded to the processor 12, etc.

Figure 2:
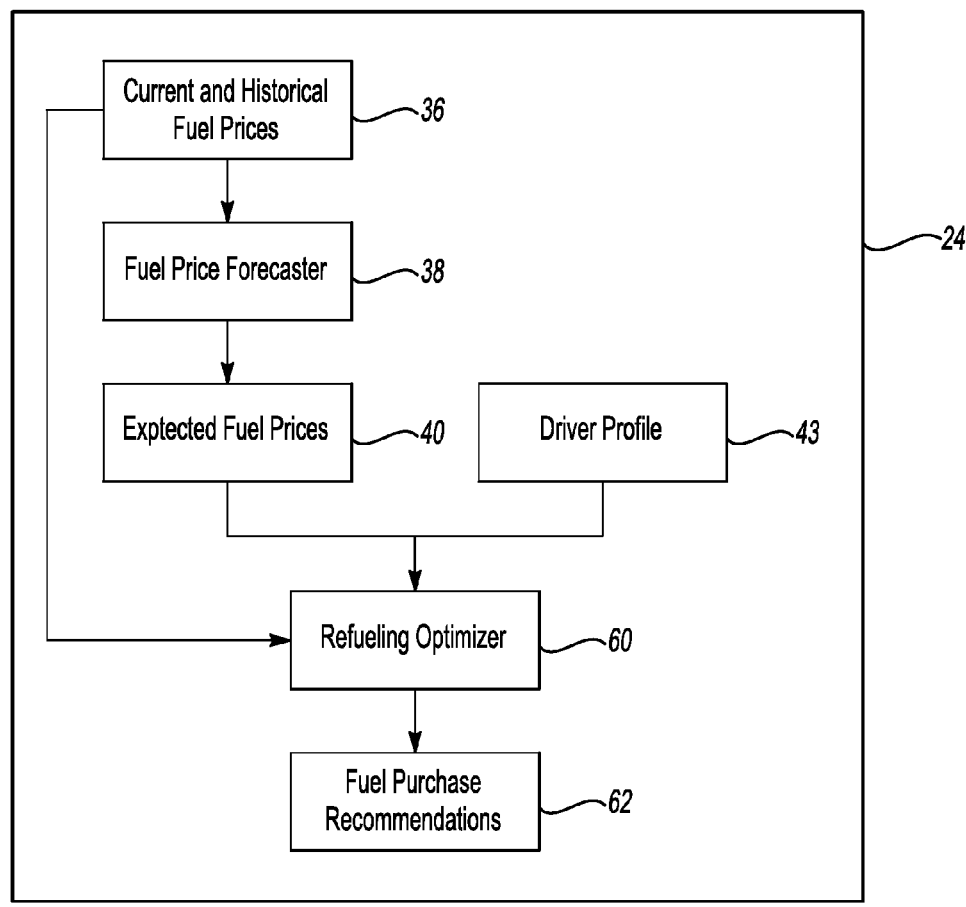
FIG. 2 is a flow chart for determining a vehicle refueling strategy according to an embodiment of the invention.

Referring now to FIG. 2, current and historical fuel prices 36 are fed into a fuel price forecaster 38. The fuel price forecaster 38 forecasts expected retail fuel prices 40 for each fuel station to be encountered based on this data. In the embodiment of FIG. 2, the fuel price forecaster 38 generates an expected intermediate fuel price, i.e., an expected fuel price greater than the wholesale fuel price paid by fuel stations when purchasing fuel from distributors, and an expected retail mark-up based on the current and historical fuel prices 36. The sum of these expected prices is equal to the expected retail price 40. In other embodiments, the fuel price forecaster 38 may use other information and other suitable techniques to forecast the expected retail fuel prices 40. For example, the expected retail fuel prices 40 may be analytically found as a function of historical wholesale fuel prices as well as factors that affect localized retail fuel prices such as regional income levels, fuel brand, etc.

The fuel price forecaster 38 of FIG. 2 uses a weighted average of a current wholesale fuel price, $z_{t-0}$, and past wholesale fuel prices, $z_{t-i}$ $\{i=1, 2, 3, 4, 5\}$ to predict a next day's intermediate fuel price, $y_{t+1}$:

$$y_{t-1} = \lambda_0 + \lambda_1 z_{t-0} + \lambda_2 z_{t-1} + \lambda_3 z_{t-2} + \lambda_4 z_{t-3} + \lambda_5 z_{t-4} + \lambda_6 z_{t-5}. \quad (1)$$

The coefficients, $\lambda_i$ $\{i=0, 1, 2, 3, 4, 5, 6\}$, sum to one and may be found, for example, by setting a current day's retail fuel price equal to $y_{t+1}$, a previous six days' wholesale fuel prices equal to $z_{t-i}$ $\{i=0, 1, 2, 3, 4, 5\}$ and solving Equation (1) using linear regression techniques. The current day's retail fuel price may be used as a proxy for the current day's intermediate fuel price because, as explained below, retail fuel prices are proportional to intermediate fuel prices.

A study of the difference between historical retail fuel prices and historical intermediate fuel prices reveals that, on average, retail mark-ups of intermediate fuel prices are highest on Saturdays and lowest on Mondays. Therefore, the fuel price forecaster 38 uses an average difference, $\Delta_{day}$ {day=Monday, Tuesday, ..., Sunday}, between intermediate and retail fuel prices, for each day of the week, to predict an expected retail mark-up.

To find the expected retail fuel price 40, $c_i$, for a coming day of the week, the fuel price forecaster 38 calculates the next day's intermediate fuel price, $y_{t+i}$, and adds it to the expected retail mark-up for that day of the week:

$$c_i = y_{t+1} + \Delta_{day}. \quad (2)$$

Figure 3:
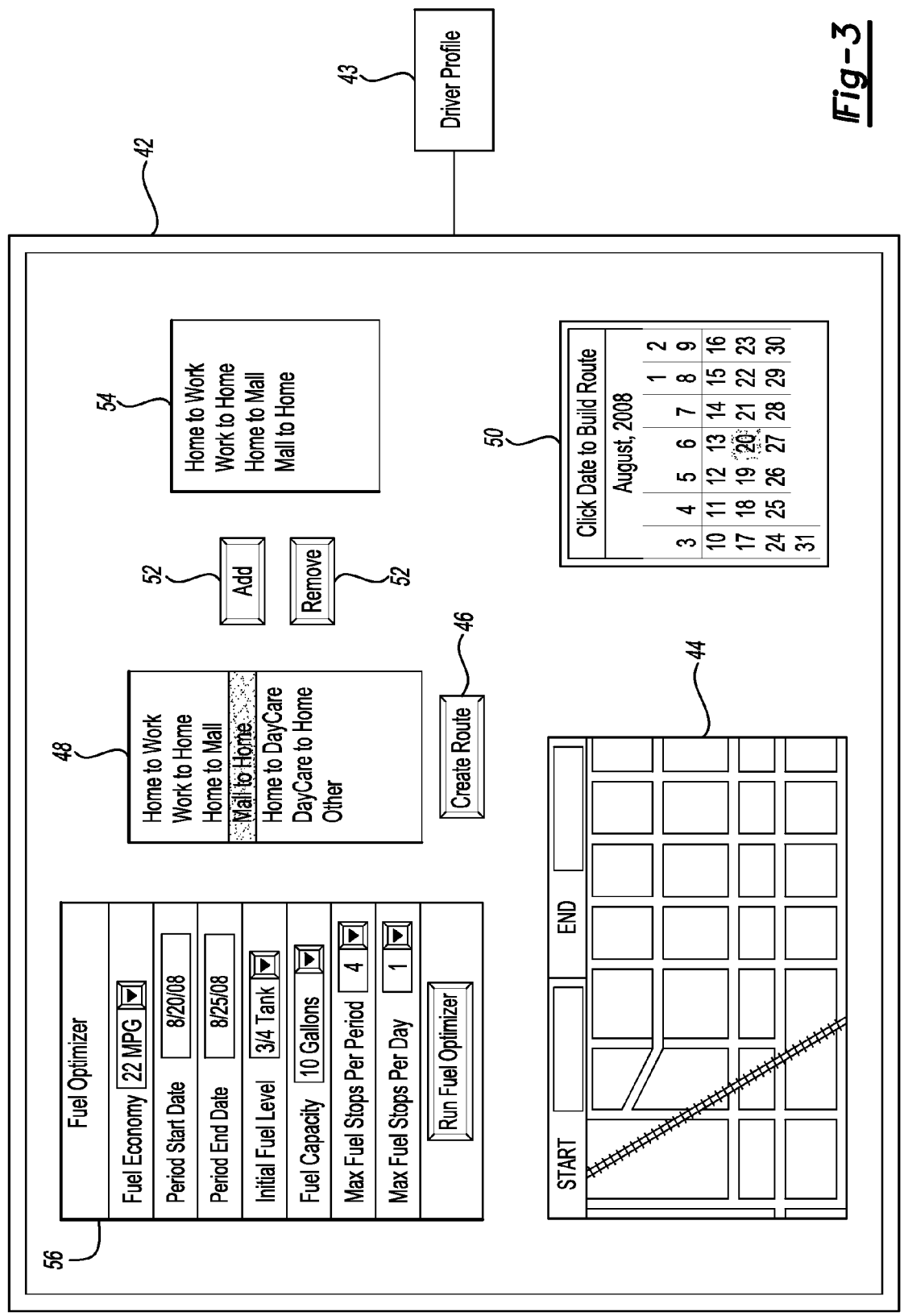
FIG. 3 is an example user interface for the vehicle refueling advisory system of FIG. 1.

Referring now to FIGS. 1 and 3, a driver may access a web site 42 hosted by the server 24 via either of the processor 12 and computer 22 to build a driver profile 43 for an upcoming driving period. This driver profile 43 may be created from standard route information. For example, the driver may create standard route information such as "Home to Work," "Work to Home," etc., using a map builder 44 and a "Create Route" tab 46. In the embodiment of FIG. 3, the map builder 44 permits the driver to enter starting and ending locations and creates a route between them. In other embodiments, the map builder 44 may allow the driver to specify a route. Any suitable mapping application, however, may be used. Selecting the "Create Route" tab 46 permits the driver to name and save the route created. The standard routes are displayed in window 48.

To build a driver profile 43, the driver selects a date from the calendar 50 and, using the add/remove buttons 52, builds a driving route 54 for the date selected. For example, for Aug. 20, 2008, the driver may build a route comprising "Home to Work," "Work to Home," "Home to Mall" and "Mall to Home." Similar routes may be built for subsequent days.

The driver may input vehicle parameters and preference information via window 56. Examples of vehicle parameters include "Fuel Economy," "Initial Fuel Level" and "Fuel Tank Capacity." Other vehicle parameters may also be included. Examples of preference information include "Period Start Date," "Period End Date," "Max Fuel Stops Per Period" and "Max Fuel Stops Per Day." Other preference information, such as brand of fuel preferred, locations where the driver is unwilling to refuel, etc., may also be included.

In other embodiments, a driver profile 43 may be created with information collected from the vehicle 10. For example, the processor 12 may communicate with the navigation system 14 and fuel system 16 to record the day by day routes traveled by the vehicle 10 and the associated fuel consumption experienced along these routes. This information, along with the current fuel level and fuel tank capacity may be communicated to the server 24. For an upcoming driving period, e.g., 5 days, the server 24 may use this historical information to determine the routes to be driven during the driving period. Other techniques to create a driver profile 43 are of course also possible.

Referring again to FIG. 2, the current fuel prices 36, expected fuel prices 40 and driver profile 43 are fed into a refueling optimizer 60. In the embodiment of FIG. 2, the refueling optimizer 60 generates fuel purchase recommendations 62 by modeling the problem of determining when, where and how much fuel to buy as a Mixed Integer Program (MIP). In other embodiments, any suitable technique, such as heuristic approaches and other discrete optimization methods, may be used to determine when, where and how much fuel to buy. Additionally, if the vehicle 10 illustrated in FIG. 1 is configured to run on several fuels, e.g., a flex-fuel vehicle, the refueling optimizer 60 may further generate recommendations as to which type of fuel to buy.

An example MIP model is described below in terms of its inputs, variables, objective function, constraints, bounds and problem formulation.

MIP Inputs

Inputs for the example MIP model are divided into the following categories: inputs regarding the vehicle 10, inputs implicit from the driver profile 43, inputs regarding driver preferences, and inputs from the current fuel prices 36 and fuel price forecaster 38:

Inputs Regarding the Vehicle 10
Max=Maximum capacity of the fuel tank (gallons)
MPG=Fuel Economy (miles per gallon)
$G_0$=Initial amount of fuel (gallons)

Inputs Implicit From the Driver Profile 43
n=Number of fuel stations along route (If there are numerous fuel stations along the route, e.g., greater than 5,000, the fuel stations may be aggregated into geographic regions and represented by the cheapest fuel station in that region.)
S=Set of fuel stations in route={1, 2, . . . , n}
m=Number of driving days in route
D=Set of days={1, 2, . . . , m}
$d_i$=Distance from starting point of route to gas station i
$NPI_t$=New period index $\forall t \in D$ ($NPI_1$=1 is the index for the first gas station in the first time period. Each of the fuel stations is referenced by only one index. For example, if on the second day, the first gas station to visit is station 256, then $NPI_2$=256.)

Inputs Regarding Driver Preferences
Min=Minimum amount of fuel in fuel tank allowed at any given time (gallons)
MST=Maximum number of stops over a specified time period
MSD=Maximum number of stops in one day Input From the Current Fuel Prices 36 and Fuel Price Forecaster 38
$C_i$=Cost of gas at station i

MIP Variables

The example MIP model contains both binary and continuous variables. The binary variables determine where to refuel and, as a result, when to refuel as each fuel station will be encountered on a particular day of the driving period. The continuous variables determine how much to refuel.

The binary variable $x_i$ determines whether or not the driver should stop at fuel station i. In other words, $$x_i = \begin{cases} 1 & \text{if stop at fuel station } i \\ 0 & \text{otherwise} \end{cases}$$

for every i∈S.
Note that the driving period is embedded in this variable as it is kept track of by the value $NPI_t$.

The continuous variable $y_i$ determines the amount of fuel (in gallons) acquired from station i for every i∈S.

MIP Objective Function

The objective function of this example minimizes the total cost of fuel when traveling on a specific route over a certain number of days. (A mathematical minimum, of course, need not be achieved to generally minimize the total cost of fuel.) The number of times the driver is willing to refuel is accounted for by the inputs MST and MSD in the constraints below. If the user does not set a preference for the number of refueling stops, then α=0; that is, no penalty is imposed. The objective function is as follows $$\min \sum_i (c_i y_i + \alpha x_i). \tag{3}$$

The objective function, however, may be different depending on the preferences of the driver. As an example, an objective function could be created to account for a driver's preference to minimize emissions during certain periods of time, e.g., ozone action days, etc. Other scenarios are also possible.

Constraints

Several constraints are used in this example MIP model. The first specifies that the vehicle 10 must always have more than the minimum amount of fuel allowed in the fuel tank at any given time. As such, when the vehicle encounters station i−1, the vehicle 10 must have enough fuel to reach station i with at least this minimum amount of fuel:

$$\text{Min} \leq G_0 - \frac{d_i}{MPG} + \sum_{j<i} y_j \ \forall \ i \in S. \tag{4}$$

The second constraint prevents the amount of fuel in the fuel tank from exceeding the capacity of the fuel tank. For each time period and at each station visited in that time period:

$$G_0 - \frac{d_i}{MPG} + \sum_{j \leq i} y_j \leq \text{Max} \ \forall \ i \in S. \tag{5}$$

The number of stops per route may also be constrained:

$$\sum_{i \in S} x_i \leq MST. \tag{6}$$

Likewise, the number of stops per day may be constrained:

$$\sum_{i \in S: i \geq NPI_{t-1} \& \ i < NPI_t} x_i \leq MSD \ \forall \ t \in D\backslash 1, \tag{7}$$

$$\sum_{i \in S: i \geq NPI_m \& \ i \leq n} x_i \leq MSD. \tag{8}$$

The last two constraints are linking constraints that guarantee if the driver does not stop at station i to refuel, then no gallons should be purchased; that is, $$y_i \leq (\text{Max}-\text{Min}) x_i \forall i \in S, \tag{9}$$

$$x_i \leq y_i \forall i \in S. \tag{10}$$

Bounds

The variable $x_i$ is a binary variable.

$$x_i \in B \ \forall i \in S. \tag{11}$$

The variable $y_i$ is a real number that must be greater than or equal to zero, but less than or equal to the size of the fuel tank minus the preference of how much fuel should always be left in the tank.

$$0 \leq y_i \leq \text{Max}-\text{Min such that } y_i \in \mathbb{R} \forall i \in S. \tag{12}$$

Note that the upper bound on the $y_i$ variable is implied by the first linking constraint in (9).

Problem Formulation $$\min_{x_i, y_i \forall i \in S} \min \sum_i (c_i y_i + \alpha x_i) \quad (13)$$

s.t.

$$\text{Min} \leq G_0 - \frac{d_i}{MPG} + \sum_{j<i} y_j \quad \forall\, i \in S$$

$$G_0 - \frac{d_i}{MPG} + \sum_{j \leq i} y_j \leq \text{Max} \quad \forall\, i \in S$$

$$\sum_{i \in S} x_i \leq MST$$

$$\sum_{i \in S: i \geq NPI_{t-1} \,\&\, i < NPI_t} x_i \leq MSD \quad \forall\, t \in D/1$$

$$\sum_{i \in S: i \geq NPI_m \,\&\, i \leq n} x_i \leq MSD$$

$$y_i \leq (\text{Max} - \text{Min}) x_i \quad \forall\, i \in S$$

$$x_i \leq y_i \quad \forall\, i \in S$$

$$x_i \in B \quad \forall\, i \in S$$

$$0 \leq y_i \leq \text{Max} - \text{Min}.$$

Referring again to FIG. 2, the refueling optimizer 60 may solve the above MIP using dual simplex methods to generate the fuel purchase recommendations 62. Other suitable methods, e.g., simplex, interior point, etc., may also be used.

The following illustrates a set of fuel purchase recommendations 62 for an example scenario. In this scenario, a five day trip has been planned in which there are 1,532 possible fuels stations to be encountered. For each fuel station, the forecasted price of fuel and the distance from the starting point is known. The vehicle averages 22 miles per gallon, holds a maximum of 15 gallons of fuel, and is starting the trip with 5 gallons of fuel. The driver has specified that 2 gallons is the minimum amount of fuel, and that they do not want to stop for fuel more than twice in one day or more than six times over the entire trip. The fuel purchase recommendations 62 are shown in Table 1.

TABLE 1

| | Optimization | | | | | Optimization with Penalty | | | |
|---|---|---|---|---|---|---|---|---|---|
| Day | ID | Distance | Price ($) | Buy | Day | ID | Distance | Price ($) | Buy |
| 1 | 28 | 15.571 | 2.799 | 10.708 | 1 | 41 | 26.685 | 2.799 | 11.213 |
| 1 | 171 | 115.498 | 2.799 | 4.542 | 2 | 367 | 284.007 | 2.837 | 10.544 |
| 3 | 484 | 373.707 | 2.821 | 6.507 | 4 | 853 | 544.649 | 2.719 | 8.098 |
| 4 | 853 | 544.649 | 2.719 | 8.098 | 5 | 1240 | 722.803 | 2.698 | 7.539 |
| 5 | 1240 | 722.803 | 2.698 | 7.539 | | | | | |
| | Total Trip Fuel Cost: $ 103.398 | | | | | Total Trip Fuel Cost: $ 103.655 | | | |

The above fuel purchase recommendations (without penalty) suggest that the driver should stop on day 1 at fuel stations 28 and 171 to purchase fuel. The driver should then make additional stops for fuel on days two, three, four, and five. The above fuel purchase recommendations (with penalty) suggest that the driver should stop on days one, two, four and five to purchase fuel.

Note that the driver is only filling up a portion of their tank each time they stop to refuel. Changing the driver's preference for maximum stops may alter these recommendations. Additionally, altering the objective function may also alter these recommendations:

$$\min \sum_i c_i y_i + \alpha x_i + p * (\text{Max} - \text{Min} - y_i). \quad (14)$$

The first additional term assigns a penalty each time the driver has to stop for fuel. The second term assigns a penalty, p, when the driver stops for fuel but does not fill up their tank all the way.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle refueling advisory system comprising:
one or more computers configured to, for a specified route to be travelled during a multi-day time period, (i) select at least one day during the multi-day time period on which to purchase fuel, (ii) select at least one fueling station along the route at which to purchase fuel for each selected day, and (iii) determine an amount of fuel to purchase at each selected fueling station, the selections and determination based on a specified maximum number of days during the multi-day time period on which fuel may be purchased and current and forecasted fuel prices for the multi-day time period to generally minimize fueling costs for the specified route.

2. The system of claim 1 wherein the selections and determination are further based on a specified maximum number of times per day fuel may be purchased.

3. The system of claim 1 wherein the selections and determination are further based on a capacity of the vehicle's fuel tank.

4. The system of claim 1 wherein the selections and determination are further based on a specified minimum amount of fuel for the vehicle's fuel tank.

5. The system of claim 1 wherein the selections and determination are further based on an initial amount of fuel in the vehicle's fuel tank.

6. The system of claim 1 wherein the one or more computers are further configured to determine the forecasted fuel prices based on past and current fuel prices.

7. A method for generating a fueling strategy that generally minimizes fueling costs for a specified route to be traveled by a vehicle during a multi-day time period, the method comprising:

determining forecasted fuel prices for the multi-day time period based on past and current fuel prices;

based on the current and forecasted fuel prices, (i) selecting at least one day during the multi-day time period on which to purchase fuel, (ii) selecting at least one fueling station along the route at which to purchase fuel for each selected day, and (iii) determining an amount of fuel to purchase at each selected fueling station; and outputting a visual representation of the selected days, selected fueling stations, and determined amounts of fuel.

8. The method of claim 7 wherein the selections and determination are further based on a specified maximum number of days during the multi-day time period on which fuel may be purchased.

9. The method of claim 7 wherein the selections and determination are further based on a specified maximum number of times per day fuel may be purchased.

10. The method of claim 7 wherein the selections and determination are further based on a capacity of the vehicle's fuel tank.

11. The method of claim 7 wherein the selections and determination are further based on a specified minimum amount of fuel for the vehicle's fuel tank.

12. The method of claim 7 wherein the selections and determination are further based on an initial amount of fuel in the vehicle's fuel tank.

* * * * *